June 5, 1973   D. L. RIPLEY   3,737,473
TWO-STAGE DEHYDROGENATION PROCESS
Filed July 27, 1970
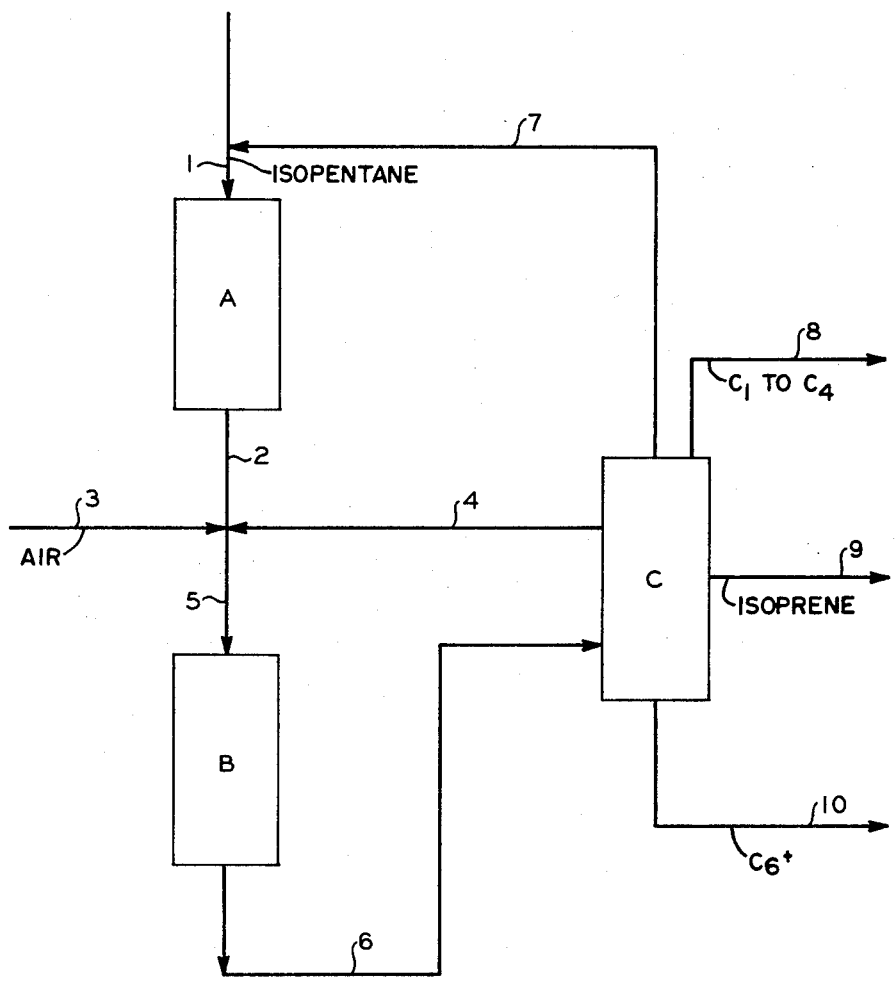
INVENTOR.
D. L. RIPLEY
BY Young & Quigg
ATTORNEYS

United States Patent Office 3,737,473
Patented June 5, 1973

3,737,473
TWO-STAGE DEHYDROGENATION PROCESS
Dennis L. Ripley, Bartlesville, Okla., assignor to
Phillips Petroleum Company
Filed July 27, 1970, Ser. No. 58,243
Int. Cl. C07c 5/18
U.S. Cl. 260—680 E                 7 Claims

ABSTRACT OF THE DISCLOSURE

A two-stage dehydrogenation process for isopentane containing feedstreams comprising a non-oxidative paraffin dehydrogenation stage followed by an iron phosphate catalyzed olefin oxidative dehydrogenation stage wherein said process eliminates the necessity of hydrogen separation steps between the non-oxidative and the oxidative stages.

---

This invention relates to the two-stage dehydrogenation of an isopentane-containing feedstream. In another aspect, this invention relates to a catalytic, non-oxidative dehydrogenation of an isopentane-containing feedstream wherein the total effluent of the first stage is oxidatively dehydrogenated with an iron phosphate catalyst in a second stage. Another aspect of this invention is the two-stage dehydrogenation process wherein the molecular hydrogen present, as a result of the dehydrogenation reaction of the first stage, is not removed from the continuous feed to the second stage, nor is it substantially burned in the oxidative dehydrogenation conditions of the second stage.

The process of my invention finds particular utility in the conversion of isopentane to isoprene. Accordingly, the invention will generally be discussed hereafter as it relates to the aforementioned process.

In the catalytic dehydrogenation of isopentane to isopentene and isoprene, two separate dehydrogenation equilibria and two different reaction rates are normally encountered. In general, it is found that at operating contions where efficient and selective dehydrogenation of isopentane to isopentene is obtained, the yield of isoprene is low because of the limitation established by thermodynamic equilibrium. On the other hand, at conditions which would thermodynamically favor high yields of diolefins, the primary dehydrogenation of the paraffin to an olefin is far too severe, resulting in an unduly high yield of low and cracked gases with poor dehydrogenation reaction selectivity.

Because of the aforementioned problems, the conversion of paraffins to diolefins is generally conducted in two stages and a number of processes have been proposed wherein a paraffin is first dehydrogenated to yield primarily monoolefins in the first stage, and these monoolefins, generally after some separation or purification treatments, are then conducted to a second dehydrogenation stage in which the monoolefins are dehydrogenated to diolefins. In some instances, the total effluent of the first stage is conducted as feed for the second stage. In other instances, the dehydrogenation of one or both of the stages is carried out oxidatively. However, the oxidative dehydrogenation of the monoolefins is generally not carried out, despite the high efficiency of a number of oxidative systems, without first removing all of the molecular hydrogen from the feed to such an oxidative unit. The presence of large amounts of molecular hydrogen is intolerable with most oxidative dehydrogenation catalyst systems because the hydrogen is burned in these systems and causes an uncontrollable and undesirable heat release. Also, the burning represents an undesirable waste of hydrogen which could be more usefully employed in other applications.

Heretofore, non-oxidative processes were generally employed for the dehydrogenation of paraffinic materials to olefinic materials. Recently, oxidative dehydrogenation processes have been developed which are particularly efficient for the dehydrogenation of monoolefins to diolefins. However, because of the hydrogen combustion problem described hereinabove, it is extremely difficult to combine a non-oxidative paraffin dehydrogenation stage with an oxidation monoolefin dehydrogenation stage without removal of at least the hydrogen by-product of the first stage before the first stage effluent can be further dehydrogenated under oxidative conditions. The present invention overcomes this problem and permits a convenient and advantageous combination of the efficient non-oxidative paraffin dehydrogenation stage with another equally efficient but oxidative monoolefin dehydrogenation stage.

Accordingly, it is an object of the present invention to provide a two-stage process wherein paraffins are non-oxidatively dehydrogenated to olefins and said olefins are oxidatively dehydrogenated to diolefins, with high diolefin yields and good process efficiencies without the heretofore necessary purification steps. Another object is to provide a process for the dehydrogenation of isopentane to isoprene.

The process of my invention pertains to a two-stage catalytic dehydrogenation production of isoprene from isopentane. This process utilizes conventional non-oxidative paraffin dehydrogenation catalysts for the first phase and specific iron-phosphate catalysts for the oxidative dehydrogenation of the second phase. The oxidative dehydrogenation of isoamylenes to isoprene has been found to take place without the oxidation of free molecular hydrogen which is present from the first stage effluent when the specific iron-phosphate catalyst system is utilized. The sequential stages of my invention involve conventional catalytic dehydrogenation of isopentane to isoamylenes and hydrogen, using either conventional non-steam active or steam active dehydrogenation catalysts. The total effluent of the first stage, including monoolefin, hydrogen, and steam if present, can be directly passed to the second stage and dehydrogenated by oxidative dehydrogenation using the iron-phosphate catalyst system. A suitable amount of air is added to the mixture prior to the second stage. If sufficient steam is not already present, a suitable amount of steam is also added to the second stage.

The hydrogen generated in the first stage effluent does not react in the second stage, to any appreciable extent, therefore not causing excessive heat release in the second stage oxidative process. The hydrogen in the second stage effluent can be effectively separated for other uses. Moreover, linear pentenes, which might be present in the effluent of the first stage are not appreciably dehydrogenated to piperylene in the second stage which utilizes the iron-phosphate catalyst system.

From the above statement of the present invention, it is readily apparent that the production of diolefins from corresponding paraffins can be effected in a manner considerably simpler and more efficient than heretofore disclosed by the art. Thus, in comparing the process of the present invention with that of conventional two-stage operations known to the art, it can be seen that the present process (1) eliminates the necessity of removing hydrogen from the first stage effluent since the free molecular hydrogen present in the first stage effluent is not converted in the oxidative second stage dehydrogenation and thus, there is no excessive heat evolution, and (2) is relatively unaffected by a n-amylenes present as a result of dehydrogenation of normal pentane in the first stage dehydrogenation. These n-pentenes are converted to only a slight extent and there is very little n-pentadiene formation, thus simplifying isoprene purification. A further advantage of the present process over conventional operations is that the effluent from the first stage dehydrogenation zone passes in its entirety along with added oxygen and steam, directly to the secondary oxidative dehydrogenation zone, with no substantial change in temperature or pressure. Still, another advantage of the present invention is that it combines an efficient paraffin dehydrogenation step with an efficient olefin oxidative dehydrogenation step while still retaining the substantial advantage of not requiring separation steps between the first and second stage.

The feed to the primary dehydrogenation stage, which contains a substantial amount of isopentane, is pre-heated to a reaction temperature ranging from about 600 to 1300° F. and preferably from about 800 to 1100° F. depending upon the specific catalyst system utilized. The aforementioned temperature ranges are those suitable for dehydrogenating isopentane to a desired isopentene product. The pre-heated primary stage feedstream is then introduced to the dehydrogenation zone at a pressure of from about 0 to 500 p.s.i.g. Any suitable apparatus using conventional modes for contacting said feedstream with the selected catalysts can be used. The basic requirement of the primary dehydrogenation zone is that it converts, as efficiently as possible, the paraffins contained in said feedstream to monoolefins. Multi-tubular reactors and vessels containing catalyst beds are well known and have been successfully used by the art for such dehydrogenation processes.

The paraffin dehydrogenation reaction is conducted under the above temperatures and pressures in the presence of any conventional non-oxidative dehydrogenation catalyst which may be selected, for example, from those containing metals of Groups IV-B, V-B, VI-B, and VIII, e.g., chromia on alumina, vanadia on alumina, nickel on kieselguhr, platinum on alumina, and the like. The conditions for the first stage dehydrogenation zone may vary accordingly within the ranges stated above depending upon the catalyst chosen.

A particularly effective catalyst system for the first stage paraffin dehydrogenation is a steam-active catalyst which comprises a small amount of platinum on a zinc aluminate spinel support material. The catalyst also contains a small amount of tin compound and preferably, a small amount of alkali or alkaline earth metal compound such as lithium or barium. The zinc aluminate spinel which is the support metal of the catalyst is a highly calcined (1500–2500° F.) material and is associated with 0.01–5 weight percent platinum, with 0.01–5 weight percent tin, and is preferably further associated with 0.01–5 weight percent of an alkali or alkaline earth metal, based upon the weight of the support material. Frequently, each of these metals is present in amounts of 0.1–1 weight percent. The catalysts are prepared using any suitable procedure. Preferably, a suitably calcined support material is impregnated with appropriate compounds of the above-described metals and then dried and calcined.

The paraffin dehydrogenation of the first stage using this catalyst is generally carried out in the presence of sufficient steam to provide a steam-to-hydrocarbon volume ratio in the range of 0.5:1 to about 30:1, preferably from about 2.5:1 to about 20:1. The total space velocity (GHSV) of the hydrocarbon and steam will range from about 100 to about 50,000, preferably from about 500 to about 20,000 volumes of gas per volume of catalyst per hour. The catalyst will slowly lose some activity and will, therefore, periodically require regeneration by conventional means, for example, by contact with steam-diluted air at elevated temperatures.

The total gaseous effluent from the first stage dehydrogenation zone, consisting predominantly of isopentenes and unreacted isopentane, with small amounts of isoprene, hydrogen, lighter gases, and heavier polymerization products, is then mixed with from about 0.1 to 3.0 volumes of oxygen, preferably 0.5 to 2.0 volumes of oxygen, per volume of hydrocarbon contained in the effluent passed into the secondary oxidative dehydrogenation zone. Optionally, an isopentene stream containing some n-pentenes, such as a $C_5$ olefinic refinery stream, can be used as part of the feed for the second dehydrogenation stage. If sufficient steam is not already present, steam is added to provide a steam:organic feed volume ratio in the range of 0.1:1 to about 100:1, preferably in the range of 5:1 to about 20:1. The pressure in this second stage can be in the range of from about 0.05 to about 250 p.s.i.g., preferably from about 0.1 to about 25 p.s.i.g. The organic feed space rate can be from about 50 to about 5,000, preferably from about 100 to about 2,500 GHSV. The second dehydrogenation stage is conducted at a temperature of from about 700 to about 1,300° F., preferably from about 800 to about 1,200° F., in the presence of steam, oxygen and an iron-phosphate catalyst system which has the aforementioned advantage of having a high selectivity for the dehydrogenation of isoamylenes and a significant lack of activity for dehydrogenation of isoamylenes and a significant lack of activity for dehydrogenation of n-amylenes or from the oxidation of free molecular hydrogen.

The iron phosphate catalyst of this oxidative second-stage dehydrogenation zone is an iron-phosphorus-oxygen catalyst such that the amount of phosphorus present is in excess of the stoichiometric amount required for the phosphorus to react in the form of phosphate ions $$(PO_4^{-3})$$

with all the iron in the catalyst. Thus, depending upon the valence of the iron, the catalyst has a phosphorus content higher than that calculated for the corresponding iron phosphate compound. The iron with the catalyst compositions can be ferric, ferrous, or ferroso-ferric and will have phosphorus contents higher than that calculated for the corresponding compound containing stoichiometric amounts of phosphorus, as shown in the following Table I.

TABLE I

| Iron phosphate compound: | Stoichiometric P content, wt. percent |
| --- | --- |
| Ferric phosphate: $FePO_4$ | 20.5 |
| Ferrous phosphate: $Fe_3(PO_4)_2$ | 17.3 |
| Ferroso-ferric phosphate: ⅓ $Fe_3(PO_4)_2 + 2FePO_4)$* | 19.6 |

*Considered to be derived from magnetic iron oxide ($Fe_3O_4$ or $FeO \cdot Fe_2O_3$).

Thus, these specific iron phosphate catalysts are iron-phosphorus-oxygen compositions in which the phosphorus content is generally in the range of from about 1.01 to about 5 times, preferably 1.01 to about 2 times, the stoichiometric amount required to react, in the form of phosphate ions, with all of the iron present, and the atomic ratio of oxygen to phosphorus is in the range of 3:1 to 3.999:1.

Except for the greater-than-stoichiometric quantity of phosphorus, the catalysts can be prepared in a number of suitable ways, such as by the treatment of iron oxides, iron hydroxides, iron phosphates, or other iron salts with phosphoric acid or by the dry mixing of iron oxides or iron salts with phosphorus pentoxide, and the like. The catalyst of this invention can be used in the form of granules, mechanically-formed pellets, or any other conventional form for catalyst. If desired, the catalyst can also be employed with suitable supporting or diluting materials such as silica, alumina, boria, magnesia, titania, zirconia, and the like.

These catalysts can be activated by conventional calcination in air at elevated temperatures and can be used for very long period of time without reactivation or regeneration. However, if regeneration becomes necessary, it can be accomplished simply by stopping the flow of hydrocarbon feed and allowing the flow of the other components, namely the air and steam, to continue for a sufficient period of time to restore a substantial amount of the catalytic activity.

Additionally, it is preferred to maintain the catalyst in a high state of activity by the continuous or intermittent addition of phosphorus-containing compounds to the catalytic zone to insure the higher-than-stoichiometric level of phosphorus in that catalytic zone. This can be done by addition of very small quantities of compounds such as phosphoric acid, phosphorus pentoxide, or other organophosphorus compounds such as triorganophosphines to the feed mixture. The rate of addition of such phosphorus-containing compounds is that which is sufficient to maintain the desired phosphorus level in the catalyst depending upon the amount of phosphorus which might be lost from the catalyst as measured by the amount of phosphorus found in the steam condensate from the reactor effluent.

The effluent from the secondary dehydrogenation zone, comprising isopentane, isopentenes, isoprene, hydrogen, lighter gases, and some heavy polymerization products pass into conventional recovery facilities to separate and recover the total isoprene content from the effluent. Any means accomplishing this is suitable for use in the present process. Unconverted isopentane and isopentenes can be recycled to the appropriate stages. Linear pentenes and other undesirables can be removed. An isoprene stream, containing relatively small amounts of piperylene, can be recovered from further purification or use.

The following examples illustrate the results of operating the subject process for the two-stage dehydrogenation of isopentane to produce isoprene. Example I and Example II illustrate two characteristics of the Zone B oxidative dehydrogenation stage and Example III provides a conventional calculated example illustrating how the total of my process works. For illustrative purposes, a simplified flow diagram has been included with this disclosure and a material balance as indicated in Table V below will summarize the stream flow of said flow diagram.

The figure depicts a simplified schematic diagram of the process of the present invention. Zone A is the non-oxidative dehydrogenation zone which is the first stage of the present process. In actually, this zone can comprise one or more individual reactors in parallel such that when one reactor is on stream, another reactor can be in a standby condition or in the regeneration phase. Zone B is the second stage or oxidative dehydrogenation zone wherein the effluent from the first-stage Zone A is further converted. Zone B can comprise one or more oxidative dehydrogenation reactors. If desired, Zone A and Zone B can be separate zones within a single reactor (not shown).

Zone C is a separation zone to which the effluent from Zone B is conducted and in which the components of that effluent are separated for subsequent recovery, discarding, or recycling. Zone C can comprise any conventional means for separating hydrocarbons and other materials such as fractionating columns, condensers, and the like.

In the figure, an isopentane-containing stream, which can contain a desired quantity of steam, is introduced into non-oxidative dehydrogenation Zone A through line 1. The effluent of Zone A leaves through line 2 and is mixed with an oxygen-containing gas such as air, from line 3 and is then conducted, along with any supplemental steam or make-up phosphorus compounds which may be necessary, to oxidative dehydrogenation Zone B through line 5. The effluent from Zone B is conducted by means of line 6 to separation Zone C wherein the effluent is separated into several fractions. Light gases such as $C_1$-$C_4$ hydrocarbons, carbon oxides, oxygen, nitrogen, and hydrogen, are removed from the process through line 8. Isolated isoprene is removed from the process through line 9 while other materials such as water, $C_6$ and heavier hydrocarbons, oxygenated materials, and traces of phosphorus compounds, are removed from the process through line 10. Unconverted isopentane is recycled to Zone A through line 7 and unconverted isopentenes are recycled to the process through line 4. If desired, the feed to Zone B can be supplemented (not shown) by a mixed amylenes stream, such as an olefinic $C_5$ refinery stream.

EXAMPLE I

The selectivity of the iron phosphate catalyst system for the dehydrogenation of isoamylenes in the presence of n-amylenes is illustrated by the following. An activated ferrous pyrophosphate catalyst (prepared by coprecipitating a ferrous sulfate solution with sodium pyrophosphate solution, filtering, washing, impregnating with phosphoric acid, and calcining, was used in the oxidative dehydrogenation conversion of three different feeds. One feed was pure pentene-2, another was pure pentene-1, and the third was a mixture containing 1% pentene-1, 9% pentene-2, and 90% 2-methylbutene-2. The oxidative dehydrogenation runs were carried out in a fixed bed reactor at 1050° F. under essentially atmospheric pressure, with a feed rate of 200 GHSV, at 800 air GHSV, and at 4,000 steam GHSV. The results of the runs are shown in the following Table II.

TABLE II

|  | Pure pentene-2 | Pure pentene-1 | Isoamylene-n-amylene mixture |
|---|---|---|---|
| n-Pentenes conversion, percent | 9.5 | 8.8 | ~0 |
| Isoamylene conversion, percent | | | 75.9 |
| Isoamylene modivity, percent [1] | | | 88.8 |

[1] A simplified selectivity to isoprene based on gas phase products only

These data show the remarkable selectively of the iron-phosphate catalyst for the dehydrogenation of isomylenes in preference to normal amylenes. This selectivity is an important feature of the process of the present invention which can satisfactorily utilize $C_5$ hydrocarbon feeds which contain substantial amounts of straight chain hydrocarbons.

EXAMPLE II

This example illustrates the remarkable ability of the iron phosphate oxidative dehydrogenation catalyst in regard to its catalytic effect on the oxidation of hydrogen. Contrary to a host of other oxidative dehydrogenation catalyst materials, the iron phosphate catalyst catalyzes little or no oxidation of hydrogen under typical dehydrogenation conditions. Two iron phosphate catalysts were contacted under reaction conditions with hydrogen, air, and steam at space rates of 200, 1,000 and 4,000 GHSV respectively. For purposes of comparison, a tin oxide-tin pyrophosphate catalyst, which also is active for oxidative dehydrogenation, was tested for its effect on the hydrogen. The results of the tests are shown on the following Table III.

TABLE III.—AVERAGE $H_2$ CONVERSION AT INDICATED TEMPERATURE

| Catalyst composition | 700° F. | 800° F. | 900° F. | 1,000° F. | 1,100° F |
|---|---|---|---|---|---|
| Precipitated $Fe_3(PO_4)_2$+$H_3PO_4$ (22.4% P) | 0 | 0 | 0 | 5-10 | 15 |
| Commercial $Fe_3(PO_4)_2$+$H_3PO_4$ (23.4% P) | 0 | 0 | 0 | 3 | 14 |
| $SnO_2$-$Sn_2P_2O_7$ (3.4% P) | 65 | 99 | 100 | 100 | 100 |

These data clearly show the unusual character of this catalyst in regard to hydrogen oxidation. The results of the tin-containing catalyst in the Table III above are representative of a large number of catalyst materials, including a number of those having dehydrogenation activity. The iron phosphate catalysts, on the other hand, are very inactive for molecular hydrogen oxidation yet give excellent oxidative dehydrogenation of isoamylenes to isoprene under the above conditions.

EXAMPLE III

The following is a calculated typical case of the process combination of the present invention. A process cycle of six hours has been shown using average conversion and selectivity for the first stage. The second stage operates continuously. The calculations and data of Example III are illustrated in table form with Table IV illustrating reaction conditions for Zones A and B and Table V illustrating the material balance of flows as referred to in the figure.

TABLE IV

| | Zone A | Zone B |
|---|---|---|
| Catalyst | Pt-Sn-Li on ZnAl₂O₄[1] | Iron phosphate+P.[2] |
| Temperature, °F | 1,050 | 1,000 to 1,050 |
| Pressure, p.s.i.g | 100 | 0 to 10 |
| Feed rate, GHSV | 1,020 | 200 |
| Steam/hydrocarbon, moles | 10.0 | 10.0 |
| Cycle length | 6.0 hrs | Continuous |

[1] 0.25% Pt, 0.15% Sn, 0.25% Li on ZnAl₂O₄.
[2] FePO₄ catalyst containing 21.7 wt. percent P.

TABLE V

| Component | Stream flows/lbs./hr. | | | | | | | | | |
|---|---|---|---|---|---|---|---|---|---|---|
| | 1 | 2 | 3 | 4 | 5 | 6 | 7 | 8 | 9 | 10 |
| Isopentane | 7,200.0 | 5,112.0 | | | 5,112.0 | 5,112.0 | 5,112.0 | | | |
| Isopentenes | | 1,644.3 | | 703.5 | 2,347.8 | 703.5 | | | | |
| n-Pentenes | | Tr. | | Tr. | Tr. | Tr. | | | | |
| Isoprene | | 236.6 | | | 236.6 | 1,672.7 | | | 1,672.7 | |
| Piperylene | | Tr. | | | Tr. | Tr. | | | | |
| C₁–C₄ | | 104.4 | | | 104.4 | 153.4 | | 153.4 | | |
| C₆+ oxygenated | | Tr. | | | Tr. | 39.5 | | | | 39.5 |
| CO, CO₂ | | 127.6 | | | 127.6 | 368.0 | | 368.0 | | |
| O₂ | | | 672.0 | | 672.0 | 67.2 | | 67.2 | | |
| N₂ | | | 2,212.0 | | 2,212.0 | 2,212.0 | | 2,212.0 | | |
| H₂ | | 79.5 | | | 79.5 | 79.5 | | 79.5 | | |
| H₂O | 18,000.0 | 17,895.6 | | | 17,895.6 | 18,379.7 | | | | 18,379.7 |
| H₃PO₄ | | | | 16.5 | 16.5 | 16.5 | | | | 16.5 |

That which is claimed is:

1. A two-stage dehydrogenation process comprising:
   contacting an isopentane-containing feedstream in a primary zone with a non-oxidative dehydrogenation catalyst under non-oxidative dehydrogenation conditions;
   contacting the total effluent from the primary zone in a secondary zone under oxidative dehydrogenation conditions with oxygen, steam, and an iron-phosphate catalyst system having a phosphorus content of about 1.01 to about 5.0 times the stoichiometric amount required to react with all the iron present; and separating the isoprene from the effluent of the oxidative dehydrogenation zone.

2. A process according to claim 1 wherein the primary non-oxidative dehydrogenation zone catalyst is a platinum on a zinc aluminate spinel support material containing small amounts of tin, alkali or alkaline earth metal compounds.

3. A process according to claim 1 wherein the primary non-oxidative dehydrogenation zone catalyst is steam activated and the isopentane-containing feedstream is steam-diluted.

4. A process according to claim 1 wherein the total effluent from said primary dehydrogenation zone is added to a feedstream containing isopenten before introduction to the oxidative dehydrogenation zone.

5. A process according to claim 1 wherein the primary zone nonoxidative dehydrogenation temperature ranges from about 600 to 1300° F. under a pressure of about 0 to about 500 p.s.i.g. and the oxidative dehydrogenation zone temperature ranges from about 700 to about 1300° F. under a pressure of about 0.05 to about 250 p.s.i.g.

6. A process according to claim 1 wherein the oxidative dehydrogenation zone has an air-to-feed ratio of from about 0.1 to about 3.0 and a steam-to-feed ratio of from about 0.1:1 to 100:1 based upon GHSV rates.

7. A process according to claim 1 wherein the phosphate is in the form of $(PO_4)^{-3}$ ions, and the oxygen-to-phosphorus atomic ratio is in the range of from about 3:1 to about 3:999:1.

References Cited

UNITED STATES PATENTS

| | | | |
|---|---|---|---|
| 3,502,739 | 3/1970 | Begley et al. | 260—680 |
| 3,161,670 | 12/1964 | Adams et al. | 260—680 |
| 3,110,746 | 11/1963 | Voge et al. | 260—680 |
| 3,461,183 | 8/1969 | Hepp et al. | 260—680 |
| 3,660,513 | 5/1972 | Davison | 260—680 |

PAUL M. COUGHLAN, Jr., Primary Examiner

U.S. Cl. X.R.

260—683.3